United States Patent
Ueno et al.

(10) Patent No.: US 10,196,716 B2
(45) Date of Patent: Feb. 5, 2019

(54) IRON-BASED POWDER FOR POWDER METALLURGY AND METHOD FOR PRODUCING IRON-BASED POWDER FOR POWDER METALLURGY

(71) Applicants: Sumitomo Electric Industries, Ltd., Osaka-shi (JP); Sumitomo Electric Sintered Alloy, Ltd., Takahashi-shi (JP)

(72) Inventors: Tomoyuki Ueno, Itami (JP); Koji Yamada, Itami (JP); Kazuya Takizawa, Takahashi (JP); Yuki Adachi, Takahashi (JP); Tetsuya Hayashi, Takahashi (JP)

(73) Assignees: Sumitomo Electric Industries, Ltd, Osaka-shi (JP); Sumitomo Electric Sintered Alloy, Ltd., Takahashi-shi (JP)

( * ) Notice: Subject to any disclaimer, the term of this patent is extended or adjusted under 35 U.S.C. 154(b) by 0 days.

(21) Appl. No.: 15/741,916

(22) PCT Filed: Feb. 2, 2017

(86) PCT No.: PCT/JP2017/003847
§ 371 (c)(1),
(2) Date: Jan. 4, 2018

(87) PCT Pub. No.: WO2017/138433
PCT Pub. Date: Aug. 17, 2017

(65) Prior Publication Data
US 2018/0202029 A1    Jul. 19, 2018

(30) Foreign Application Priority Data

Feb. 8, 2016    (JP) ................. 2016-022293

(51) Int. Cl.
B22F 1/02        (2006.01)
C22C 1/00        (2006.01)
(Continued)

(52) U.S. Cl.
CPC .............. C22C 33/02 (2013.01); B22F 1/00 (2013.01); B22F 1/0011 (2013.01);
(Continued)

(58) Field of Classification Search
CPC ......... C22C 1/05; C22C 1/101; C22C 1/1084; B22F 1/02; B22F 1/025; B22F 2009/044
(Continued)

(56) References Cited

U.S. PATENT DOCUMENTS 5,968,226 A * 10/1999 Okinaka ................. B22F 1/004
                                                      423/593.1
6,264,718 B1 * 7/2001 Akagi ................. C22C 33/0221
                                                      419/10

FOREIGN PATENT DOCUMENTS

| JP | H09-279203 A | 10/1997 |
| JP | 2002-003980 A | 1/2002 |
| JP | 2009-035796 A | 2/2009 |

* cited by examiner

Primary Examiner — Hoa (Holly) Le
(74) Attorney, Agent, or Firm — Venable LLP; Michael A. Sartori; Miguel A. Lopez

(57) ABSTRACT

An iron-based powder for powder metallurgy includes an iron-based powder and a composite oxide powder, and the composite oxide contains, by mass, from 15% to 30% Si, from 9% to 18% Al, from 3% to 6% B, from 0.5% to 3% Mg, from 2% to 6% Ca, from 0.01% to 1% Sr, and from 45% to 55% O.

14 Claims, 4 Drawing Sheets

(51) Int. Cl.
| | |
|---|---|
| *C22C 33/02* | (2006.01) |
| *B22F 1/00* | (2006.01) |
| *C03C 8/02* | (2006.01) |
| *B24D 18/00* | (2006.01) |
| *C22C 38/04* | (2006.01) |
| *C03C 3/091* | (2006.01) |
| *C22C 32/00* | (2006.01) |
| *C22C 38/00* | (2006.01) |
| *B22F 9/04* | (2006.01) |

(52) U.S. Cl.
CPC .......... *B24D 18/0009* (2013.01); *C03C 3/091* (2013.01); *C03C 8/02* (2013.01); *C22C 32/0026* (2013.01); *C22C 33/0207* (2013.01); *C22C 33/0228* (2013.01); *C22C 33/0235* (2013.01); *C22C 33/0257* (2013.01); *C22C 38/04* (2013.01); *B22F 9/04* (2013.01); *B22F 2009/044* (2013.01); *B22F 2301/35* (2013.01); *B22F 2302/35* (2013.01); *B22F 2304/10* (2013.01); *C03C 2214/08* (2013.01); *C22C 38/00* (2013.01)

(58) Field of Classification Search
USPC ......... 75/232, 234, 235, 246, 252, 751, 758; 423/277, 278, 325, 331, 593.1, 594.16, 423/599, 600; 419/19, 66; 501/77
See application file for complete search history.

SAMPLE NO. 2

SAMPLE NO. 111

SAMPLE NO. 2

SAMPLE NO. 111

IRON-BASED POWDER FOR POWDER METALLURGY AND METHOD FOR PRODUCING IRON-BASED POWDER FOR POWDER METALLURGY

TECHNICAL FIELD

The present invention relates to an iron-based powder for powder metallurgy and a method for producing an iron-based powder for powder metallurgy.

This application claims priority to Japanese Patent Application No. 2016-022293 filed Feb. 8, 2016, the entire contents of which are incorporated herein by reference.

BACKGROUND ART

PTL 1 and PTL 2 disclose mixing a base powder containing an iron-based powder with a machinability-improving powder in order to provide a sintered body with improved machinability, pressing the mixed powder to form a compact, and sintering the compact to form a sintered body. As specific examples of the machinability-improving powder, PTL 1 discloses manganese sulfide (MnS) powder and boron nitride (BN) powder, and PTL 2 discloses anorthite powder and gehlenite powder, which are $CaO$—$Al_2O_3$—$SiO_2$-based composite oxide powders.

CITATION LIST

Patent Literature

PTL 1: Japanese Unexamined Patent Application Publication No. 2002-3980
PTL 2: Japanese Unexamined Patent Application Publication No. 9-279203

SUMMARY OF INVENTION

An iron-based powder for powder metallurgy of the present disclosure includes an iron-based powder and a composite oxide powder, and
the composite oxide contains, by mass:
from 15% to 30% Si,
from 9% to 18% Al,
from 3% to 6% B,
from 0.5% to 3% Mg,
from 2% to 6% Ca,
from 0.01% to 1% Sr, and
from 45% to 55% O.

A method for producing an iron-based powder for powder metallurgy of the present disclosure is a method for producing an iron-based powder for powder metallurgy by mixing an iron-based powder with a composite oxide powder, the method including:
heating a composite oxide containing, by mass:
from 15% to 30% Si,
from 9% to 18% Al,
from 3% to 6% B,
from 0.5% to 3% Mg,
from 2% to 6% Ca,
from 0.01% to 1% Sr, and
from 45% to 55% O to a melting point of the composite oxide or higher and then performing cooling or rapid cooling to prepare a composite oxide frit;
coarsely pulverizing the composite oxide frit to an average particle diameter of 20 µm or less to prepare a coarse powder;
finely pulverizing the coarse powder to a predetermined particle diameter with an airflow pulverizer, which uses no grinding media, to prepare a fine powder; and
mixing the fine powder with the iron-based powder by using a shear force mixer capable of breaking up aggregates of the fine powder.

DESCRIPTION OF EMBODIMENTS

Figure 1:
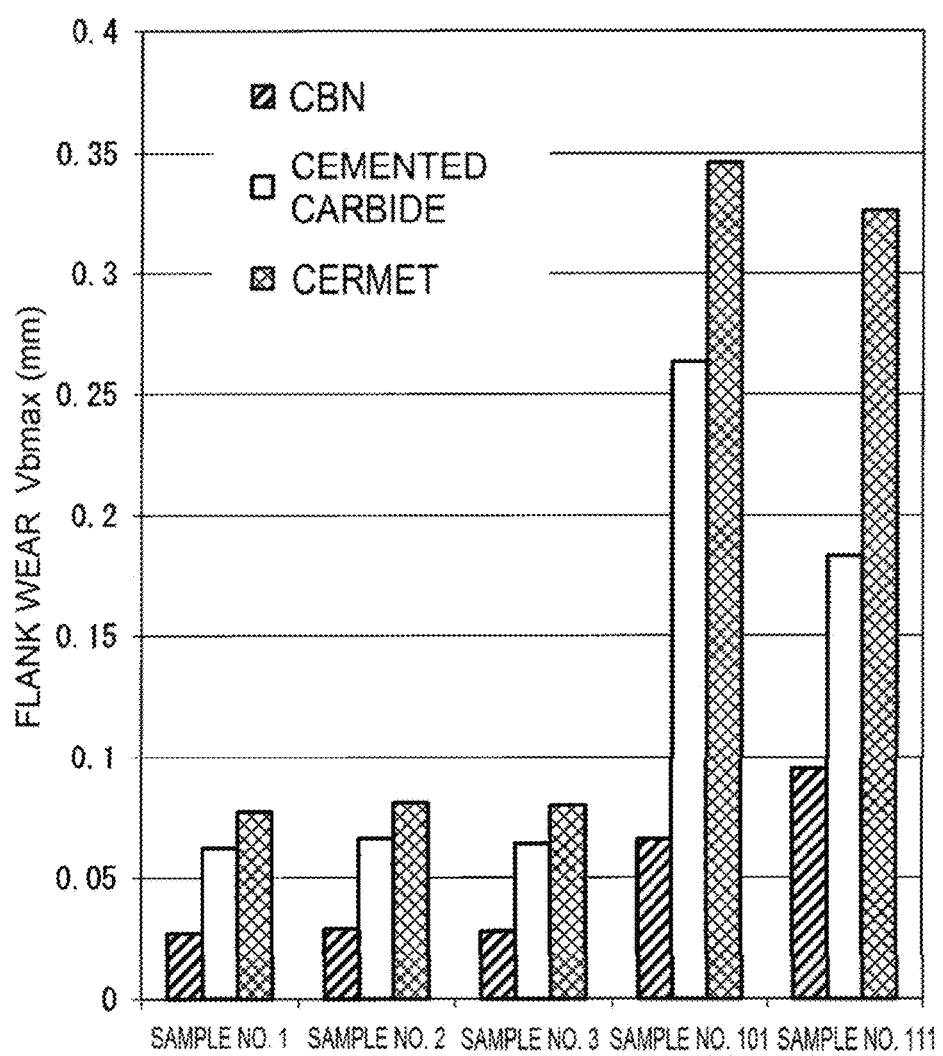
FIG. 1 is a graph showing the results of cutting test 1.

[Problems to be Solved by the Present Disclosure]
Sintered bodies, when used for parts that require high precision or when formed into shapes that are difficult to form by pressure molding using a die, are further subjected to machining such as cutting and thus require good machinability.

It is generally known that adding MnS or BN as a machinability-improving powder in such an amount that machinability is improved degrades mechanical properties. The machinability-improving mechanism of adding a $CaO$—$Al_2O_3$—$SiO_2$-based composite oxide powder as a machinability-improving powder is unfortunately not clear; for example, the lifetime of a tool undesirably becomes shorter if working conditions are not optimal.

To meet recent demands for efficient production of automotive parts, there is a need to achieve highly efficient working and prolong the lifetime of working tools by using sintered bodies having sufficient machinability, and there is also a need to develop materials that provide such sintered bodies.

Thus, an object of the present disclosure is to provide an iron-based powder for powder metallurgy that provides an iron-based sintered body with high machinability. Another object of the present disclosure is to provide a method for producing an iron-based powder for powder metallurgy that provides an iron-based sintered body with high machinability.

[Effects of the Present Disclosure]
According to the present disclosure, an iron-based powder for powder metallurgy that provides an iron-based sintered body with high machinability can be provided. According to the present disclosure, a method for producing such an iron-based powder for powder metallurgy that provides an iron-based sintered body with high machinability can also be provided.

[Description of Embodiments of the Present Invention]
First, embodiments of the present invention will be enumerated and described.

(1) An iron-based powder for powder metallurgy according to an embodiment of the present invention includes an iron-based powder and a composite oxide powder, and the composite oxide contains, by mass, from 15% to 30% Si, from 9% to 18% Al, from 3% to 6% B, from 0.5% to 3% Mg, from 2% to 6% Ca, from 0.01% to 1% Sr, and from 45% to 55% O.

An iron-based sintered body obtained using the iron-based powder for powder metallurgy has high machinability mainly for the following three reasons. First, the composite oxide, during cutting of the iron-based sintered body (during wet working using a coolant) at a cutting edge temperature of a cutting tool, i.e., about 450° C. to 780° C., is thermally softened and covers the cutting edge surface of the cutting tool to form a protective film. At least part of the protective film originating from the composite oxide is interposed between the iron-based sintered body and the cutting tool and thus can inhibit the interdiffusion of constituent elements, particularly, constituent elements other than those originating from the composite oxide, between the iron-based sintered body and the cutting tool. This can reduce the diffusion wear of the cutting tool.

Second, the affinity of the composite oxide for Fe, which forms the base of the iron-based sintered body, is lower than the affinity of the cutting tool for Fe. Since at least part of the protective film originating from the composite oxide is interposed between the iron-based sintered body and the cutting tool, the adhesion of Fe to the cutting edge of the cutting tool can be inhibited, so that the adhesive wear of the cutting tool can be reduced.

Third, the composite oxide, at the above-described tool cutting edge temperature, is thermally softened and extends in a cutting direction so as to follow the cutting edge of the cutting tool. The cutting direction refers to the direction of motion of the cutting edge of the cutting tool relative to a workpiece (sintered body). The thermally softened composite oxide serves as a lubricant and thus can reduce the working resistance during cutting, and therefore the iron-based sintered body has high machinability.

(2) In one exemplary embodiment of the iron-based powder for powder metallurgy, the composite oxide further contains, by mass, at least one element selected from from 0.005% to 1% Na, from 0.005% to 1% K, from 0.005% to 2% Ti, and from 0.005% to 5% Ba.

According to this embodiment, the viscosity of the thermally softened composite oxide at a tool cutting edge temperature at a point of working an iron-based sintered body can be effectively reduced, and the flowability of the composite oxide can be improved. This assists in the formation of a protective film on the cutting edge surface of the cutting tool and can also provide more improved lubricity.

(3) In one exemplary embodiment of the iron-based powder for powder metallurgy, the content of the composite oxide powder in the iron-based powder for powder metallurgy is from 0.01% by mass to 0.3% by mass.

When the composite oxide powder in an amount of 0.01% by mass or more is contained in the iron-based powder for powder metallurgy, an iron-based sintered body containing a sufficient amount of composite oxide powder can be provided. In this case, the protective film originating from the composite oxide is readily kept formed on the cutting edge surface of the cutting tool, and more improved lubricity can also be provided. When the content of the composite oxide powder in the iron-based powder for powder metallurgy is excessively high, the content of the iron-based powder is relatively low, leading to low strength. Thus, when the content of the composite oxide powder in the iron-based powder for powder metallurgy is 0.3% by mass or less, a sintered body having sufficient strength can be provided.

(4) In one exemplary embodiment of the iron-based powder for powder metallurgy, the composite oxide has a softening point of 780° C. or lower and a viscosity at the softening point of $1 \times 10^{7.6}$ dPa·s or less.

When the composite oxide has a softening point of 780° C. or lower, the composite oxide, at a tool cutting edge temperature at a point of working an iron-based sintered body, is thermally softened to have a reduced viscosity and increased flowability, which assist in the formation of a protective film on the cutting edge surface of the cutting tool and can also provide more improved lubricity. In particular, when the viscosity at the softening point is $1 \times 10^{7.6}$ dPa·s or less, the flowability of the thermally softened composite oxide can be sufficiently ensured.

(5) In one exemplary embodiment of the iron-based powder for powder metallurgy, the composite oxide has a glass transition point of 680° C. or lower.

When the composite oxide has a glass transition point of 680° C. or lower, the composite oxide, at a tool cutting edge temperature at a point of working an iron-based sintered body, is thermally softened to have a reduced viscosity and increased flowability, which assist in the formation of a protective film on the cutting edge surface of the cutting tool and can also provide more improved lubricity.

(6) In one exemplary embodiment of the iron-based powder for powder metallurgy, the composite oxide powder has an average particle diameter of 10 μm or less, the average particle diameter being not more than ⅕ an average particle diameter of the iron-based powder, and a maximum particle diameter of 20 μm or less.

When the composite oxide powder is fine, that is, has an average particle diameter of 10 μm or less, the composite oxide, at a tool cutting edge temperature at a point of working an iron-based sintered body, is readily thermally softened to improve the machinability of the iron-based sintered body. When the composite oxide powder is sufficiently small compared with the iron-based powder, particles of the composite oxide readily interpose between the iron-based powders, and the composite oxide powder is readily uniformly dispersed in the iron-based sintered body. The composite oxide powder uniformly dispersed in the iron-based sintered body tends to improve the machinability of the iron-based sintered body.

(7) In one exemplary embodiment of the iron-based powder for powder metallurgy, the composite oxide powder has an average particle diameter of 5 μm or less, the average particle diameter being not more than 1/10 the average particle diameter of the iron-based powder, and a maximum particle diameter of 10 μm or less.

The finer the composite oxide powder is, the better the machinability of the iron-based sintered body tends to be.

(8) In one exemplary embodiment of the iron-based powder for powder metallurgy, the composite oxide contains an amorphous component in an amount of 30% by mass or more.

When the composite oxide contains an amorphous component in an amount of 30% by mass or more, the composite oxide is thermally softened at a tool cutting edge temperature at a point of working an iron-based sintered body, and readily exhibits lubricity and readily forms a protective film.

(9) In one exemplary embodiment of the iron-based powder for powder metallurgy, the iron-based powder for powder metallurgy further contains at least one of a graphite powder and at least one non-Fe metal powder selected from Cu, Ni, Cr, and Mo powders.

Pre-mixing any one of the above powders with the iron-based powder can provide an iron-based sintered body with improved strength.

(10) In one exemplary embodiment of the iron-based powder for powder metallurgy containing a graphite powder, the graphite powder has an average particle diameter of from 2 μm to 30 μm and is contained in an amount of from 0.2% by mass to 3.0% by mass based on the total amount of the iron-based powder for powder metallurgy.

When the graphite powder having the above size is contained within the above range, C can diffuse during sintering to achieve solid solution strengthening, thereby providing an iron-based sintered body with improved strength.

(11) In one exemplary embodiment of the iron-based powder for powder metallurgy containing a non-Fe metal powder, the non-Fe metal powder has an average particle diameter of from 10 μm to 100 μm and is contained in an amount of from 0.5% by mass to 6.5% by mass based on the total amount of the iron-based powder for powder metallurgy.

The presence of the non-Fe metal powder having the above size within the above range can improve sinterability and provide an iron-based sintered body with improved strength and fatigue characteristics.

(12) A method for producing an iron-based powder for powder metallurgy according to an embodiment of the present invention is a method for producing an iron-based powder for powder metallurgy by mixing an iron-based powder with a composite oxide powder, and the method includes the following steps.

Heating a composite oxide containing, by mass, from 15% to 30% Si, from 9% to 18% Al, from 3% to 6% B, from 0.5% to 3% Mg, from 2% to 6% Ca, from 0.01% to 1% Sr, and from 45% to 55% O to a melting point of the composite oxide or higher and then performing cooling or rapid cooling to prepare a composite oxide frit Coarsely pulverizing the composite oxide frit to an average particle diameter of 20 μm or less to prepare a coarse powder Finely pulverizing the coarse powder to a predetermined particle diameter with an airflow pulverizer, which uses no grinding media, to prepare a fine powder Mixing the fine powder with the iron-based powder by using a shear force mixer capable of breaking up aggregates of the fine powder After the raw composite oxide is processed into a fine powder, mixing the fine powder while breaking up aggregates thereof allows the composite oxide powder to be uniformly dispersed throughout the iron-based powder for powder metallurgy. The uniform dispersion of the composite oxide powder provides an iron-based sintered body with high machinability.

(13) In one exemplary embodiment of the method for producing an iron-based powder for powder metallurgy, the airflow pulverizer is a jet mill.

Using a jet mill allows the fine pulverization to be easily performed in a short time, leading to higher productivity.

(14) In one exemplary embodiment of the method for producing an iron-based powder for powder metallurgy, the mixer is a double cone mixer, a stirring mixer, or an eccentric mixer.

Using a double cone mixer, a stirring mixer, or an eccentric mixer allows the aggregates of the fine powder to be sufficiently broken up and the composite oxide powder to be uniformly dispersed in the iron-based sintered body.

[Details of Embodiment of the Present Invention]

An iron-based powder for powder metallurgy and a method for producing an iron-based powder for powder metallurgy according to an embodiment of the present invention will be described in more detail.

[Iron-Based Powder for Powder Metallurgy]

An iron-based powder for powder metallurgy according to an embodiment includes an iron-based powder and a composite oxide powder. The iron-based powder for powder metallurgy may further include at least one of a graphite powder and at least one non-Fe metal powder selected from Cu, Ni, Cr, and Mo powders. The main feature of the iron-based powder for powder metallurgy according to the embodiment is that the composite oxide contains Si, Al, B, Mg, Ca, Sr, and O in specific ranges. The composite oxide may further contain at least one element selected from Na, K, Ti, and Ba. The components will be described below.

<<Iron-Based Powder>>

The iron-based powder is a powder composed of particles containing iron as a principal component (the iron (Fe) content of the iron-based powder is 99.0% by mass or more). The iron-based powder may be, for example, a pure iron powder such as an atomized iron powder or a reduced iron powder, a pre-alloyed steel powder prepared by alloying alloying elements in advance, or a partially diffusion-alloyed steel powder prepared by alloying alloying elements through partial diffusion. These powders may be used alone or as a mixture. The iron-based powder forms a base of a sintered body obtained using the iron-based powder for powder metallurgy. The iron-based powder may have an average particle diameter (D50 diameter: a particle diameter corresponding to 50% in a cumulative distribution curve based on mass) of from about 50 μm to about 150 μm and may be contained in an amount of from 92.0% by mass to 99.9% by mass based on the total amount of the iron-based powder for powder metallurgy.

<<Graphite Powder>>

The graphite powder is a powder containing graphite. When the graphite powder is contained in the iron-based powder for powder metallurgy, C can diffuse during sintering to achieve solid solution strengthening, thereby providing a sintered body with improved strength. The graphite powder may have an average particle diameter of from about 2 μm to about 30 μm and may be contained in an amount of from 0.2% by mass to 3.0% by mass based on the total amount of the iron-based powder for powder metallurgy.

<<Non-Fe Metal Powder>>

The non-Fe metal powder is a powder containing at least one metal element selected from Cu, Ni, Cr, and Mo. The presence of the non-Fe metal powder in the iron-based powder for powder metallurgy can improve sinterability and provide a sintered body with improved strength and fatigue characteristics. The non-Fe metal powder may have an average particle diameter of from about 10 μm to about 100 μm or less and may be contained in an amount of from 0.5% by mass to 6.5% by mass based on the total amount of the iron-based powder for powder metallurgy. In particular, when a Cu powder is used as the non-Fe metal powder, the Cu powder may have an average particle diameter of from about 10 μm to about 80 μm and may be contained in an amount of from 0.5% by mass to 3.0% by mass based on the total amount of the iron-based powder for powder metallurgy.

<<Composite Oxide Powder>>

The composite oxide powder is a powder composed of particles of an oxide (composite oxide) containing a plurality of types of metal elements. The presence of the composite oxide powder in the iron-based powder for powder metallurgy improves the machinability of a sintered body obtained using the iron-based powder for powder metallurgy. At a tool cutting edge temperature at a point of working the sintered body, the composite oxide powder is thermally softened to form a protective film on the cutting edge surface of the tool and serve as a lubricant. The thermally softened composite oxide can reduce the diffusion wear, the adhesive wear, and the cutting resistance of the cutting tool and improve the machinability of the sintered body. Details of the protective film originating from the composite oxide and the lubricating effect will be described in Test Example below.

(Composition)

The composite oxide contains Si, Al, B, Mg, Ca, Sr, and O in specific ranges. The composite oxide may further contain at least one element selected from Na, K, Ti, and Ba in a specific range. The contents and the effects of the elements will be described below. The contents of the elements are mass ratios relative to the composition of the composite oxide taken as 100%.

Si

Si is contained in an amount of from 15% by mass to 30% by mass. Si is an element that contributes to improving the strength of a composite oxide having an amorphous component and forms the base of the composite oxide. This effect can be successfully produced when the Si content is 15% by mass or more. The Si content may be 17% by mass or more, or 18.5% by mass or more. When the Si content is 30% by mass or less, the melting point of the composite oxide can be reduced. The Si content may be 26% by mass or less, or 23% by mass or less.

Al

Al is contained in an amount of from 9% by mass to 18% by mass. Al is an element that improves the chemical durability of the composite oxide and improves the stability of the composite oxide to increase the ability of amorphous formation, thereby inhibiting the crystallization of the composite oxide. This effect can be successfully produced when the Al content is 9% by mass or more. The Al content may be 11% by mass or more, or 12.5% by mass or more. An excessively high Al content tends to deteriorate the meltability of the composite oxide to cause an increase in viscosity, leading to an increased glass transition point and an increased softening point. When the glass transition point and the softening point of the composite oxide are excessively high, the composite oxide is not readily thermally softened at a tool cutting edge temperature at a point of working a sintered body, which impedes the formation of a protective film on the cutting edge surface of the tool and makes it difficult to produce a lubricating effect. When the Al content is 18% by mass or less, the glass transition point and the softening point can be reduced and a sintered body with improved machinability can be provided. The Al content may be 16% by mass or less, or 15.5% by mass or less.

B

B is contained in an amount of from 3% by mass to 6% by mass. B is an element that contributes to improving the meltability of the composite oxide. When the B content is 3% by mass or more, this effect can be successfully produced and the glass transition point and the softening point can be reduced. The B content may be 3.5% by mass or more, or 4.0% by mass or more. When the B content is 6% by mass or less, the chemical durability of the composite oxide can be ensured. The B content may be 5.8% by mass or less, or 5.5% by mass or less.

Mg

Mg is contained in an amount of from 0.5% by mass to 3% by mass. Mg is an element that contributes to improving the stability of the composite oxide. This effect can be successfully produced when the Mg content is 0.5% by mass or more. The Mg content may be 0.8% by mass or more, or 1.0% by mass or more. When the Mg content is 3% by mass or less, a composite oxide having an amorphous component is readily formed. The Mg content may be 2.7% by mass or less, or 2.4% by mass or less.

Ca

Ca is contained in an amount of from 2% by mass to 6% by mass. Ca is an element that contributes to improving the stability of the composite oxide and improves the chemical durability of the composite oxide. This effect can be successfully produced when the Ca content is 2% by mass or more. The Ca content may be 2.4% by mass or more, or 2.8% by mass or more. When the Ca content is 6% by mass or less, the increase in viscosity can be suppressed. The Ca content may be 5.5% by mass or less, or 5.0% by mass or less.

Sr

Sr is contained in an amount of from 0.01% by mass to 1% by mass. Sr is an element that contributes to improving the stability of the composite oxide. This effect can be successfully produced when the Sr content is 0.01% by mass or more. The Sr content may be 0.05% by mass or more, or 0.10% by mass or more. An excessively high Sr content fails to produce the above effect, and thus the Sr content is 1% by mass or less. The Sr content may be 0.7% by mass or less, or 0.5% by mass or less.

O

O is contained in an amount of from 45% by mass to 55% by mass. When the O content is 45% by mass or more, the stability and the chemical durability of the composite oxide can be improved. The O content may be 46% by mass or more, or 48% by mass or more. An excessively high O content tends to form a coarse composite oxide, which affects the machinability, the strength, and other properties of a sintered body. When the O content is 55% by mass or less, a sintered body with improved machinability and strength can be provided. The O content may be 54% by mass or less, or 52% by mass or less.

Na, K, Ti, Ba

Na and K are elements that contribute to a reduction in glass transition point and a reduction in viscosity. These elements may be contained each in an amount of from 0.005% by mass to 1% by mass. The Na content may be from 0.01% by mass to 0.8% by mass, or from 0.015% by mass to 0.06% by mass. The K content may be from 0.008% by mass to 0.8% by mass, or from 0.01% by mass to 0.5% by mass. Ti and Ba are elements that improve the stability of the composite oxide and also improve the chemical durability of the composite oxide. The Ti content is from 0.005% by mass to 2% by mass, and may be from 0.15% by mass to 1.5% by mass, or from 0.3% by mass to 1.0% by mass. The Ba content is from 0.005% by mass to 5% by mass, and may be from 0.8% by mass to 4.3% by mass, or from 1.5% by mass to 3.6% by mass.

(Structure)

The composite oxide preferably contains an amorphous component in an amount of 30% by mass or more. When the composite oxide contains a large amount of amorphous component, the composite oxide, at a tool cutting edge temperature at a point of working a sintered body, can be thermally softened to exhibit lubricity and can also form a protective film originating from the composite oxide. The amount of amorphous component in the composite oxide may be 50% by mass or more, or 70% by mass or more. Substantially the entire composite oxide may be amorphous. The amorphous component in the composite oxide can be measured by determining the location of the composite oxide from the difference in contrast between the iron-based base material and the composite oxide using a field emission scanning electron microscope (FE-SEM) and then determining the crystalline state from an electron diffraction pattern obtained using a transmission electron microscope (TEM).

The composite oxide preferably has a softening point of 780° C. or lower. The tool cutting edge temperature at a point of working a sintered body depends on the composition of the sintered body used as a workpiece and is about 450° C. to 780° C. in wet working using a coolant. Even if the tool cutting edge temperature is about 450° C. during steady working, it may increase locally and instantaneously to 600° C. or higher. When the composite oxide has a softening point of 780° C. or lower, the composite oxide, at the tool cutting edge temperature at a point of working the sintered body, is thermally softened to have increased flowability, so that the composite oxide can exhibit lubricity and can also form a protective film originating from the composite oxide. When the tool cutting edge temperature at a point of working the sintered body is about 450° C. to 700° C., the softening point of the composite oxide may be 700° C. or lower, 600° C. or lower, or 500° C. or lower. The tool cutting edge temperature can be measured by the following method. An optical fiber is inserted into a small hole (about 1 mm φ) formed in the sintered body, and the wavelength of radiation emitted from the sintered body is detected by the optical fiber. The absolute temperature of the cutting edge at the instant it passes through the hole is determined from the wavelength using a two-color thermometer. The softening point can be measured by thermomechanical analysis (TMA) or kinematic viscosity measurement.

The viscosity of the composite oxide at the above softening point is preferably $1 \times 10^{7.6}$ dPa·s or less. With such a viscosity, the flowability of the thermally softened composite oxide can be sufficiently ensured and lubricity can be effectively exhibited at a tool cutting edge temperature at a point of working the sintered body, and the cutting edge surface of the tool can be sufficiently covered with a protective film originating from the composite oxide.

The composite oxide preferably has a glass transition point of 680° C. or lower. When the composite oxide has a glass transition point of 680° C. or lower, the composite oxide, at a tool cutting edge temperature at a point of working a sintered body, is thermally softened to have a reduced viscosity and increased flowability, so that the composite oxide can exhibit lubricity and can also form a protective film originating from the composite oxide. The glass transition point of the composite oxide may be 550° C. or lower, or 450° C. or lower. The glass transition point of the composite oxide can be measured, for example, by differential scanning calorimetry (DSC) or TMA. Alternatively, the glass transition point and the softening point can be calculated from the composition of the composite oxide, or can be calculated using, for example, thermodynamic equilibrium calculation software and thermodynamic database FactStage.

The composite oxide powder preferably has an average particle diameter of 10 μm or less. When the composite oxide powder is fine, the composite oxide, at a tool cutting edge temperature at a point of working a sintered body, is readily heated and thus readily softened to improve the machinability of the sintered body. The composite oxide powder more preferably has an average particle diameter of 5 μm or less, still more preferably 3 μm or less, particularly preferably 1.2 μm or less. The composite oxide powder preferably has a maximum particle diameter of 20 μm or less, more preferably 15 μm or less, still more preferably 10 μm or less. The composite oxide powder, when having an average particle diameter of 0.2 μm or more, or 0.4 μm or more, is easy to handle during its production process.

The average particle diameter of the composite oxide powder is preferably not more than ⅕ the average particle diameter of the iron-based powder. When the composite oxide powder is sufficiently small compared with the iron-based powder, particles of the composite oxide readily interpose between the iron-based powders, and the composite oxide powder is readily uniformly dispersed in a sintered body. The composite oxide powder uniformly dispersed in the sintered body tends to improve the machinability of the sintered body. The average particle diameter of the composite oxide powder is more preferably not more than ¹⁄₁₀, still more preferably not more than ¹⁄₂₀ the average particle diameter of the iron-based powder.

(Content)

The content of the composite oxide powder in the iron-based powder for powder metallurgy is preferably from 0.01% by mass to 0.3% by mass. When the composite oxide powder in an amount of 0.01% by mass or more is contained in the iron-based powder for powder metallurgy, the composite oxide powder does not aggregate and tends to be uniformly dispersed in a sintered body. In this case, a protective film originating from the composite oxide can be kept formed on the cutting edge surface of a tool, and the protective film can reduce the diffusion wear and the adhesive wear of the cutting tool. In addition, the lubricating effect can be effectively exhibited to reduce the working resistance during cutting. When the content of the composite oxide powder in the iron-based powder for powder metallurgy is excessively high, the composite oxide powder tends to aggregate and thus may locally form a coarse composite oxide. In this case, a sintered body having reduced strength is provided. Thus, when the content of the composite oxide powder in the iron-based powder for powder metallurgy is 0.3% by mass or less, a sintered body having sufficient strength can be provided. The content of the composite oxide powder in the iron-based powder for powder metallurgy may be from 0.03% by mass to 0.22% by mass, or from 0.05% by mass to 0.16% by mass.

<<Others>>

The iron-based powder for powder metallurgy may further contain, in addition to the above-described powders, an organic substance that serves as a compaction lubricant. Examples of the organic substance include zinc stearate, stearamide, ethylene bis-stearamide, oleamide, palmitamide, behenamide, erucamide, lithium stearate, calcium stearate, magnesium stearate, sodium stearate, and aluminum stearate. The content of the organic substance is preferably from about 0.3% by mass to about 1.2% by mass based on the total amount of the iron-based powder for powder metallurgy taken as 100% by mass. An organic substance in an amount of 0.3% by mass or more can reduce the friction with a die and can improve productivity. An organic substance in an amount of 1.2% by mass or less causes little decrease in compact density and thus little decrease in density of a sintered body. The content of the organic substance may be from 0.5% by mass to 1.0% by mass. When die-lubrication compaction, in which a lubricant is applied to a die, is used, the amount of lubricant added to the iron-based powder for powder metallurgy may be 0.3% by mass or less.

[Method for Producing Iron-Based Powder for Powder Metallurgy]

The iron-based powder for powder metallurgy according to an embodiment can be typically produced through a process including preparing a composite oxide frit, coarsely pulverizing the frit to prepare a coarse powder, finely pulverizing the coarse powder to prepare a fine powder, and mixing the fine powder with an iron-based powder to produce a mixed powder (iron-based powder for powder metallurgy).

Preparation of Composite Oxide Frit

A composite oxide containing Si, Al, B, Mg, Ca, Sr, and O in specific ranges is heated to its melting point or higher and then cooled or rapidly cooled to prepare a composite oxide frit. The composite oxide may further contain at least one element selected from Na, K, Ti, and Ba in a specific range. The contents of these elements are the same as those of the elements in the composite oxide powder described above. The heating temperature may be appropriately set according to the composition of the composite oxide and may be about 1,000° C. to 1,700° C.

Preparation of Coarse Powder by Coarse Pulverization of Frit

The composite oxide frit is coarsely ground to an average particle diameter of 20 μm or less to prepare a composite oxide coarse powder. The coarse pulverization may be, for example, mechanical pulverization using a jaw crusher, a roll crusher, a stamp mill, a Brown mill, or a ball mill.

Preparation of Fine Powder by Fine Pulverization of Coarse Powder

The composite oxide coarse powder is finely ground to a predetermined particle diameter to prepare a fine powder. The fine pulverization is performed using an airflow pulverizer, which uses no grinding media. The airflow pulverizer may be, for example, a jet mill. Performing the fine pulverization without a grinding medium can prevent contamination, achieve pulverization with no residual coarse particles, and suppress excessive fine pulverization.

Production of Mixed Powder by Mixing of Fine Powder with Iron-Based Powder

The composite oxide fine powder is mixed with an iron-based powder to produce a mixed powder (iron-based powder for powder metallurgy). A graphite powder and/or at least one non-Fe metal powder selected from Cu, Ni, Cr, and Mo powders may optionally be mixed with the mixed powder. The mixing of the powders is performed by forced stirring and mixing using a shear force mixer capable of breaking up aggregates of the fine powder. The mixer may be, for example, a double cone mixer, a stirring mixer, or an eccentric mixer. Forcedly stirring and mixing the powders can uniformly disperse the composite oxide fine powder in the iron-based powder. The powders may be mixed by a two-stage mixing method including preliminarily mixing the composite oxide powder with the graphite powder (which has a specific gravity comparable to that of the composite oxide) to prepare a premixed powder and mixing the premixed powder with the iron-based powder and, optionally, with the non-Fe metal powder.

[Method for Producing Sintered Body]

The sintered body can be typically produced through a process including compacting the iron-based powder for powder metallurgy obtained by the production method described above to prepare a compact and sintering the compact to produce a sintered body.

Preparation of Compact

First, the iron-based powder for powder metallurgy obtained by the production method described above is loaded into a die and compacted to prepare a compact. The compacting pressure may be, for example, from about 400 MPa to about 1,200 MPa. A compact of complex shape can be obtained by adjusting the shape of a cavity of the die.

Production of Sintered Body

The above compact is sintered in a nitrogen or converted gas atmosphere at a temperature of about 1,000° C. to 1,350° C. for about 10 minutes to 120 minutes to produce a sintered body.

[Applications]

The iron-based powder for powder metallurgy according to an embodiment is suitable for use in various iron-based sintered bodies. The method for producing an iron-based powder for powder metallurgy according to an embodiment can be applied to the production of iron-based sintered bodies and other fields.

Test Example 1

A sintered body was produced using an iron-based powder for powder metallurgy containing an iron-based powder and a composite oxide powder, and the sintered body was subjected to a cutting test.

Samples No. 1 and 101

An iron-based powder, a graphite powder, a Cu powder, and composite oxide powders were provided as base powders. The iron-based powder contained Fe, 0.18 mass % Mn, and 0.004 mass % S. The average particle diameter of the iron-based powder was 74.55 μm. The average particle diameter in Test Example is a D50 diameter (particle diameter corresponding to 50% in a cumulative distribution curve based on mass) determined by the Microtrac method (laser diffraction/scattering). The iron-based powder had a D10 diameter (particle diameter corresponding to 10% in the cumulative distribution curve based on mass) of 31.39 μm, a D95 diameter (particle diameter corresponding to 95% in the cumulative distribution curve based on mass) of 153.7 μm, and a maximum particle diameter of 228.2 μm. The average particle diameter, i.e., the D50 diameter, of the graphite powder was 28 μm. The average particle diameter, i.e., the D50 diameter, of the Cu powder was 30 μm.

The composite oxide powders used were composed of composite oxides having compositions shown in Table 1. The contents of each composite oxide shown in Table 1 are mass ratios relative to the composition of the composite oxide taken as 100%. The average particle diameter, i.e., the D50 diameter, of each composite oxide powder was 0.87 μm. The composite oxide powders each had a D10 diameter of 0.55 μm, a D95 diameter of 3.30 μm, and a maximum particle diameter of 10.09 μm. The composite oxide powders were each prepared by heating a composite oxide having the composition shown in Table 1 to its melting point or higher and then performing cooling to prepare a composite oxide frit, coarsely pulverizing the composite oxide frit with a ball mill, and then finely pulverizing the coarse powder using a jet mill. For each of the composite oxide powders obtained, its location was determined from the difference in contrast between the composite oxide powder and the iron-based base material using a FE-SEM, and then the crystalline state was determined from an electron diffraction pattern obtained using a TEM to find out that the amount of amorphous component in the composite oxide was 35% by mass.

The above powders were provided such that the iron-based powder, the Cu powder, the graphite powder, and the composite oxide powder were in a mass ratio of 97.1:2.0:0.8:0.1, and a compaction lubricant was further added in a mass ratio of 0.8 relative to the total mass of the powders and mixed using a stirring mixer to prepare a mixed powder (iron-based powder for powder metallurgy). In the mixing, a lubricant may be applied to a die instead of mixing the compaction lubricant, i.e., an organic substance.

The mixed powder was loaded into the die and compacted under a pressure of 700 MPa to prepare a cylindrical compact having an outer diameter of 60 mm φ, an inner diameter of 10 mm φ, and a height of 40 mm.

The compact was heat-treated in a converted gas atmosphere at 1,130° C. for 15 minutes to produce a sintered body (samples No. 1 to 3 and 101).

TABLE 1

| Sample No. | Contents of Composite Oxide (mass %) | | | | | | | | | | | Glass Transition Point (° C.) | Softening Point (° C.) |
|---|---|---|---|---|---|---|---|---|---|---|---|---|---|
| | Si | Al | B | Mg | Ca | Sr | Na | K | O | Ti | Ba | | |
| 1 | 18 | 13 | 5 | 0.6 | 5 | 0.1 | 0.5 | 0.2 | 52 | 1.6 | 4 | 520 | 720 |
| 2 | 20 | 15 | 5 | 2 | 4 | 0.2 | 0.3 | — | 50 | 0.5 | 3 | 550 | 740 |
| 3 | 25 | 10 | 4 | 1.2 | 5 | 0.4 | 0.4 | — | 51 | 1 | 2 | 530 | 730 |
| 101 | 36.5 | — | 6.4 | — | — | — | — | 1.1 | 56 | — | — | 730 | 1000 |

Sample No. 111

Sample No. 111 is a sample obtained using an iron-based powder for powder metallurgy containing, as base powders, an iron-based powder, a graphite powder, a Cu powder, and no composite oxide powder. Other conditions are the same as those for samples No. 1 to 3.

<<Mechanical Properties>>

From each of the sintered bodies of samples No. 1 to 3, 101, and 111, a test piece for mechanical property testing was prepared and measured for Rockwell hardness HRB, Vickers hardness Hv, and transverse rupture strength TRS. The Rockwell hardness was measured on the B scale using a commercially available hardness meter. The transverse rupture strength was measured by three-point bending. The results are shown in Table 2. The results show that whether a composite oxide is present or absent has no influence on the mechanical properties of the sintered bodies.

TABLE 2

| Sample No. | Rockwell Hardness HRB | Vickers Hardness Hv (GPa) | Transverse Rupture Strength TRS (MPa) |
|---|---|---|---|
| 1 | 85.9 | 2.90 | 812 |
| 2 | 85.5 | 2.91 | 815 |
| 3 | 85.4 | 2.92 | 814 |
| 101 | 85.4 | 2.91 | 817 |
| 111 | 85.6 | 2.92 | 815 |

<<Cutting Test 1>>

A side surface of each of the sintered bodies of samples No. 1 to 3, 101, and 111 was cut using a lathe. The cutting was performed using various cutting tools under the following conditions: cutting speed, 200 m/min; feed rate, 0.1 mm/rev; cutting depth, 0.2 mm; wet. The cutting tools used were a cemented carbide insert having a nose radius of 0.8 mm and a rake angle of 0°, a cermet insert having a nose radius of 0.8 mm and a rake angle of 0°, and a tool equipped with a cubic boron nitride (CBN) insert having a nose radius of 1.2 mm and a rake angle of 0°. When the cemented carbide insert or the cermet insert was used, the length of cut was 2,500 mm, and when the CBN insert was used, the length of cut was 4,500 mm.

Amount of Flank Wear of Cutting Tool

For each of the cemented carbide, cermet, and CBN cutting tools, the amount of flank wear was measured after cutting. Specifically, the cutting edge of the cutting tool after cutting was observed under a tool maker's microscope, and the amount of wear was measured using a micrometer. The results are shown in FIG. 1.

FIG. 1 shows that when samples No. 1 to 3, each containing a composite oxide powder having a softening point of 780° C. or lower, were cut using the above cutting tools, the amount of flank wear was smaller than when sample No. 101, containing a composite oxide powder having a softening point of 1,000° C., and sample No. 111, containing no composite oxide powder, were cut. In the case where the cemented carbide cutting tool was used to cut the samples, the amount of flank wear was reduced by as much as about 76% (sample No. 1), about 75% (sample No. 2), and about 76% (sample No. 3) compared with sample No. 101. Similarly, the amount of flank wear was reduced by as much as about 66% (sample No. 1), about 65% (sample No. 2), and about 65% (sample No. 3) compared with sample No. 111. In the case where the CBN cutting tool was used to cut the samples, the amount of flank wear was reduced by as much as about 59% (sample No. 1), about 55% (sample No. 2), and about 57% (sample No. 3) compared with sample No. 101. Similarly, the amount of flank wear was reduced by as much as about 72% (sample No. 1), about 70% (sample No. 2), and about 71% (sample No. 3) compared with sample No. 111. In the case where the cermet cutting tool was used to cut the samples, the amount of flank wear was reduced by as much as about 78% (sample No. 1), about 77% (sample No. 2), and about 77% (sample No. 3) compared with sample No. 101. Similarly, the amount of flank wear was reduced by as much as about 76% (sample No. 1), about 75% (sample No. 2), and about 75% (sample No. 3) compared with sample No. 111.

Observation of Cutting Edge of Cutting Tool

Figure 2:
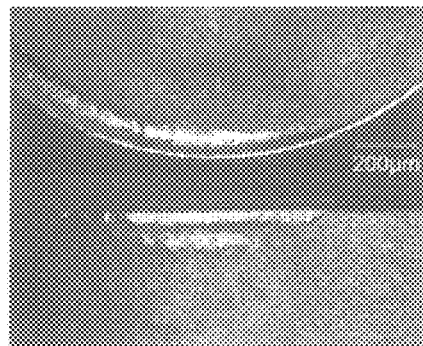
FIG. 2 shows tool maker's microscope images of cutting edges of cutting tools after cutting in cutting test 1.
Figure 2:
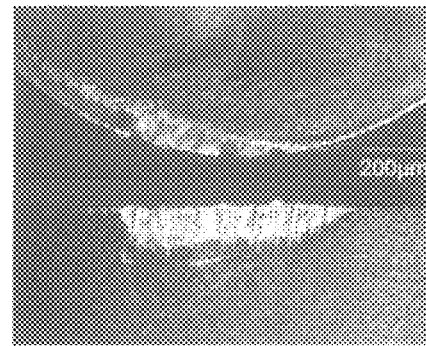

As an example, cutting edges of cemented carbide cutting tools were observed after cutting. FIG. 2 shows tool maker's microscope images of cutting edges of cutting tools after cutting sample No. 2 and sample No. 111. In FIG. 2, rake faces are shown in the upper halves, and flanks in the lower halves. Almost no adhesive wear is found in the cutting edge of the cutting tool used to cut sample No. 2. In contrast, significant adhesive wear is found in the cutting edge of the cutting tool used to cut sample No. 111.

Figure 3:
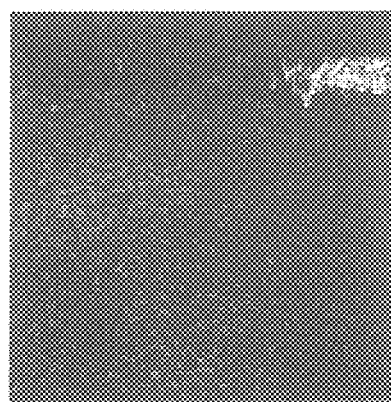
FIG. 3 shows field emission scanning electron micrographs of flanks of cutting tools after cutting in cutting test 1.
Figure 3:
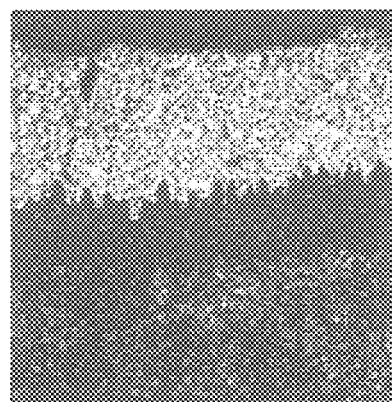

One reason for the adhesive wear of the cutting edges of the cutting tools is that at a tool cutting edge temperature at a point of working a sintered body, constituent elements of the sintered body and constituent elements of the cutting tool interdiffuse therebetween, and the constituent elements of the sintered body adhere to the cutting tool. Thus, adherents on the surface of the cutting tools were examined. FIG. 3 shows field emission scanning electron micrographs (150×) of flanks of cutting tools after cutting sample No. 2 and sample No. 111. No adherents are found on the flank of the cutting tool used to cut sample No. 2. In contrast, a thick adherent is found on the flank of the cutting tool used to cut sample No. 111. The adherent was analyzed to contain Fe, which was attributed to the adhesion of Fe forming the base of the sintered body used as a workpiece.

Figure 4:
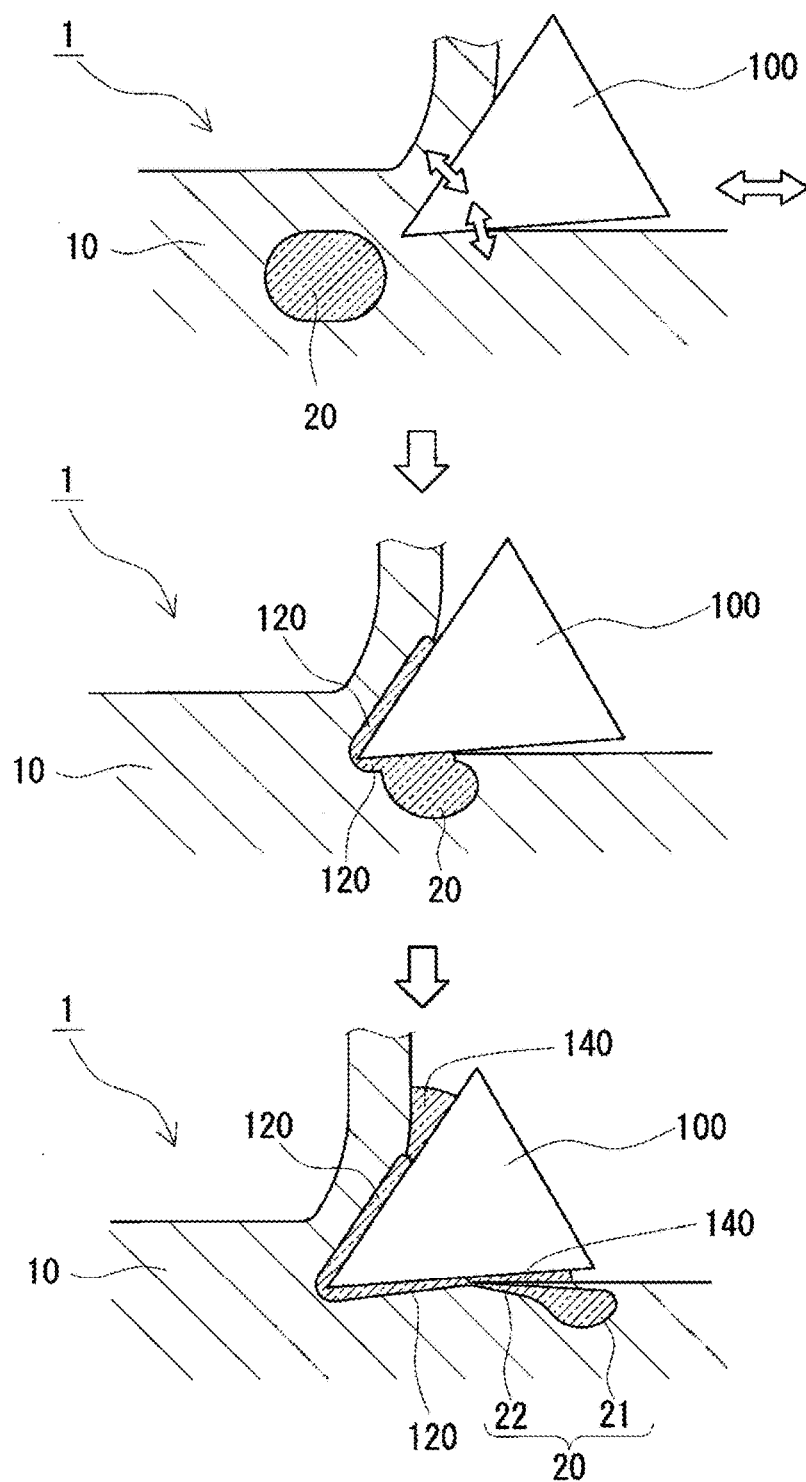
FIG. 4 schematically illustrates states of a composite oxide during cutting of a sintered body according to an embodiment.

From the above, it was found that in the sintered body of sample No. 2, the adhesion of Fe forming the base of the sintered body to the cutting tool was inhibited, so that the adhesive wear of the cutting tool was reduced and the amount of flank wear of the cutting tool was reduced. It was also found that the sintered bodies of samples No. 1 and 3 exhibited the same phenomenon. The mechanism by which the adhesion of Fe to cutting tools can be inhibited in the sintered bodies of samples No. 1 to 3 will be described with reference to FIG. 4.

When sintered bodies 1 of samples No. 1 to 3 (hereinafter referred to simply as sintered bodies) are each cut with a cutting tool 100, the cutting edge temperature of the cutting tool 100 increases to about 450° C. to 780° C. although depending on the composition of the sintered body 1. Upon the increase of the cutting edge temperature of the cutting tool 100, constituent elements of the sintered body 1 and constituent elements of the cutting tool 100 interdiffuse therebetween as shown in the upper part of FIG. 4. The sintered body 1 contains a composite oxide 20 having a specific composition, and upon contact of the cutting tool 100 with the composite oxide 20, the composite oxide 20 is thermally softened at the above tool cutting edge temperature. The thermally softened composite oxide 20 is caused to have a reduced viscosity and increased flowability and consequently covers the cutting edge surface of the cutting tool 100 to form a protective film 120, as shown in the middle part of FIG. 4. At least part of the protective film 120 is interposed between the sintered body 1 (a base portion 10) and the cutting tool 100 and thus serves to inhibit the interdiffusion of constituent elements, particularly, constituent elements other than those originating from the composite oxide, between the sintered body 1 and the cutting tool 100. When the sintered body 1 is further cut, the protective film 120 formed on the cutting edge surface is spread along the flank and the rake face of the cutting tool 100 to form residence portions 140 and adhere, as shown in the lower part of FIG. 4. Since the composite oxide 20 is uniformly dispersed in the sintered body 1, the following cycle continues: (1) the cutting tool 100 comes into contact with the composite oxide 20; (2) the composite oxide 20 is thermally softened to form the protective film 120; and (3) the protective film 120 having a protective function forms the residence portions 140. Due to this state of the composite oxide 20, the protective film 120 is always formed on the cutting edge surface of the cutting tool 100, and as a result, the adhesion of Fe to the cutting tool 100 can be inhibited.

<<Cutting Test 2>>

A side surface of each of the sintered bodies of samples No. 2 and 101 was cut using a lathe. The cutting was performed using a cutting tool including a cermet grooving tool under the following conditions: cutting speed, 200 m/min; feed rate, 0.1 mm/rev; cutting depth, 0.2 mm; wet.

Observation of Worked Cross Section of Sintered Body

Figure 5:
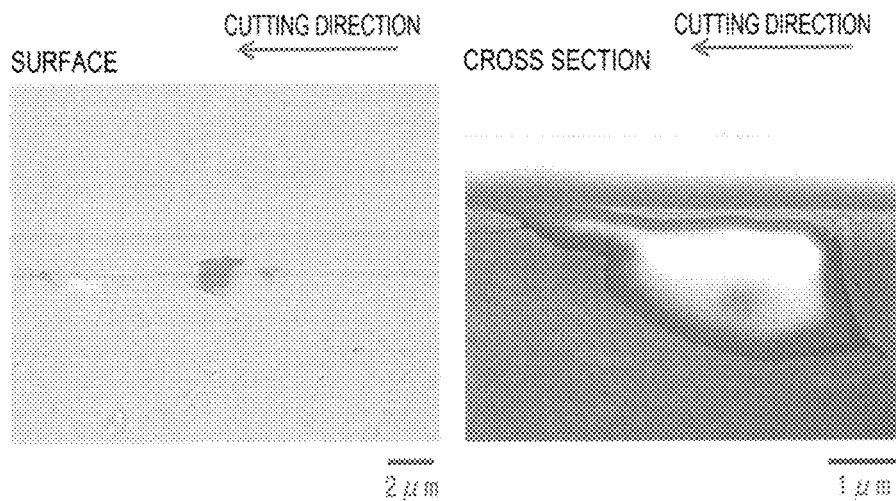
FIG. 5 shows field emission scanning electron micrographs of a surface and a cross section of sample No. 1 after cutting in cutting test 2.

To examine the influence of the composition of the composite oxide on machinability, worked cross sections of sintered bodies were observed after cutting. FIG. 5 shows field emission scanning electron micrographs (10,000×) of a surface of sample No. 2 after cutting and a cross section of a composite oxide observed in the surface, the cross section being obtained by focused ion beam (FIB) processing. The dark part found in the surface of sample No. 2 is the composite oxide. As shown in the cross section, the composite oxide of sample No. 2 has a shape having a portion buried in the sintered body at a surface region within about 3 μm from the surface and an exposed extending portion extending from the buried portion in the cutting direction and exposed on the surface. In other words, in sample No. 2, the composite oxide extends in the cutting direction.

Figure 6:
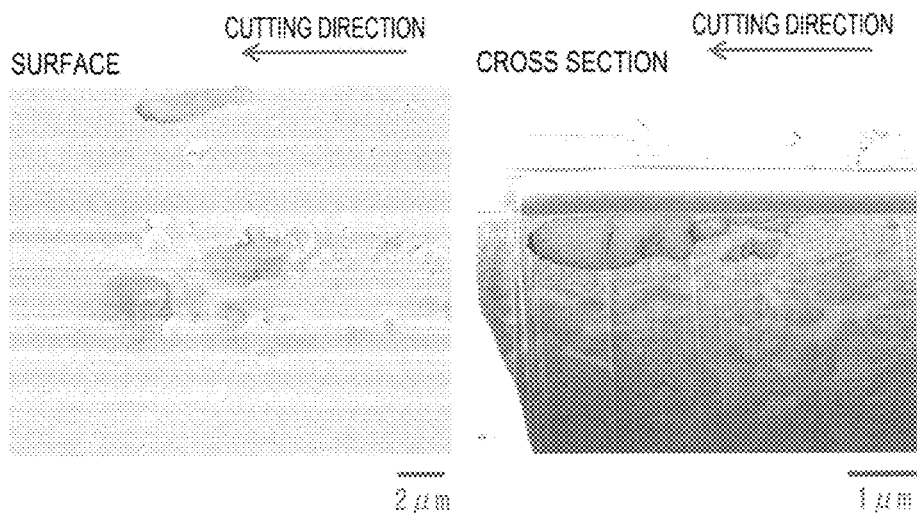
FIG. 6 shows field emission scanning electron micrographs of a surface and a cross section of sample No. 101 after cutting in cutting test 2.

FIG. 6 shows field emission scanning electron micrographs (10,000×) of a surface of sample No. 101 after cutting and a cross section of a composite oxide observed in the surface, the cross section being obtained by FIB processing. The dark part found in the surface of sample No. 101 is the composite oxide. The composite oxide of sample No. 101 does not have a portion extending in the cutting direction and has cracks. In other words, in sample No. 101, the composite oxide does not extend in the cutting direction and is cracked.

From the above, it was found that in the sintered body of sample No. 2, since the composite oxide had a specific composition and thus a low glass transition point and a low softening point, the composite oxide was thermally softened and extended in the cutting direction at a tool cutting edge temperature during cutting. This thermally softened composite oxide can probably serve as a lubricant to reduce the cutting resistance during cutting. It was also found that the sintered bodies of samples No. 1 and 3 exhibited the same phenomenon. The mechanism by which the composite oxides in the sintered bodies of samples No. 1 to 3 extend in the cutting direction will be described with reference to FIG. 4.

When the sintered bodies 1 of samples No. 1 to 3 (hereinafter referred to simply as the sintered bodies) are each cut with the cutting tool 100, the cutting edge temperature of the cutting tool 100 increases to about 450° C. to 780° C. although depending on the composition of the sintered body 1. Upon contact of the cutting tool 100 with the composite oxide 20, the composite oxide 20 is thermally softened at the above tool cutting edge temperature and caused to have a reduced viscosity and increased flowability. The thermally softened composite oxide 20 extends so as to follow the cutting edge of the cutting tool 100, as shown in the lower part of FIG. 4, and is consequently deformed into a irregular shape having a buried portion 21 buried in the base portion 10 of the sintered body 1 in an inner portion distal to the cutting tool 100 and an exposed extending portion 22 extending from the buried portion 21 in the cutting direction and exposed on the surface. Since the composite oxide 20 is uniformly dispersed in the sintered body 1, the cutting tool 100 is always in contact with the exposed extending portion 22 of the composite oxide 20. The composite oxide 20 can serve as a lubricant to provide improved machinability.

<<Cutting Test 3>>

The same cutting test as the above cutting test 2 was repeatedly performed on each of the sintered bodies of samples No. 1 to 3, 101, and 111 until the cutting tool was worn to cause a quality failure such as cloudiness or stripping on a worked surface or a burr on a worked end surface. The tool life was determined by the number of sintered bodies subjected to cutting. The tool lives determined were as follows: sample No. 1, 249; sample No. 2, 244; sample No. 3, 245; sample No. 101, 47; and sample No. 111, 95, showing that the sintered bodies of samples No. 1 to 3 achieved significantly improved tool lives.

The results of the cutting tests described above show that the presence of a composite oxide having a specific composition in a sintered body can provide improved machinability and a prolonged tool life. This is because, as described in Observation of Cutting Edge of Cutting Tool and Observation of Worked Cross Section of Sintered Body, the composite oxide is thermally softened at a tool cutting edge temperature during cutting of the sintered body to perform the following two functions. (1) The thermally softened composite oxide covers the cutting edge surface of the cutting tool to form a protective film, and the film inhibits the adhesion of Fe to the cutting tool to reduce the adhesive wear. (2) The thermally softened composite oxide extends so as to follow the cutting edge of the cutting tool, and as a result, the composite oxide serves as a lubricant to reduce the cutting resistance during cutting.

The present invention is not to be construed as being limited to the foregoing description and is defined by the appended claims. All changes which come within the meaning and range of equivalency of the claims are to be embraced within their scope. For example, in Test Example described above, at least one of the composition, the particle diameter, and the production conditions of the iron-based powder for powder metallurgy may be changed. With regard to the composition, for example, the content of at least one element selected from Si, Al, B, Mg, Ca, Sr, and O may be changed, or an element selected from Na, K, Ti, and Ba may be contained in a specific range.

REFERENCE SIGNS LIST

1: sintered body
10: base portion, 20: composite oxide, 21: buried portion, 22: exposed extending portion
100: cutting tool, 120: protective film, 140: residence portion

The invention claimed is:

1. An iron-based powder for powder metallurgy, comprising an iron-based powder and a composite oxide powder, wherein the composite oxide contains, by mass:
   from 15% to 30% Si,
   from 9% to 18% Al,
   from 3% to 6% B,
   from 0.5% to 3% Mg,
   from 2% to 6% Ca,
   from 0.01% to 1% Sr, and
   from 45% to 55% O.

2. The iron-based powder for powder metallurgy according to claim 1,
   wherein the composite oxide further contains, by mass, at least one element selected from:
   from 0.005% to 1% Na,
   from 0.005% to 1% K,
   from 0.005% to 2% Ti, and
   from 0.005% to 5% Ba.

3. The iron-based powder for powder metallurgy according to claim 1, wherein a content of the composite oxide powder in the iron-based powder for powder metallurgy is from 0.01% by mass to 0.3% by mass.

4. The iron-based powder for powder metallurgy according to claim 1,
   wherein the composite oxide has a softening point of 780° C. or lower and a viscosity at the softening point of $1 \times 10^{7.6}$ dPa·s or less.

5. The iron-based powder for powder metallurgy according to claim 1, wherein the composite oxide has a glass transition point of 680° C. or lower.

6. The iron-based powder for powder metallurgy according to claim 1,
   wherein the composite oxide powder has an average particle diameter of 10 μm or less, the average diameter being not more than 1/5 an average particle diameter of the iron-based powder, and a maximum particle diameter of 20 μm or less.

7. The iron-based powder for powder metallurgy according to claim 1, wherein the composite oxide powder has an average particle diameter of 5 μm or less, the average particle diameter being not more than 1/10 the average particle diameter of the iron-based powder, and a maximum particle diameter of 10 μm or less.

8. The iron-based powder for powder metallurgy according to claim 1, wherein the composite oxide contains an amorphous component in an amount of 30% by mass or more.

9. The iron-based powder for powder metallurgy according to claim 1, further comprising at least one of a graphite powder and at least one non-Fe metal powder selected from Cu, Ni, Cr, and Mo powders.

10. The iron-based powder for powder metallurgy according to claim 9, wherein the graphite powder has an average particle diameter of from 2 μm to 30 μm and is contained in an amount of from 0.2% by mass to 3.0% by mass based on a total amount of the iron-based powder for powder metallurgy.

11. The iron-based powder for powder metallurgy according to claim 9, wherein the non-Fe metal powder has an average particle diameter of from 10 μm to 100 μm and is contained in an amount of from 0.5% by mass to 6.5% by mass based on the total amount of the iron-based powder for powder metallurgy.

12. A method for producing an iron-based powder for powder metallurgy by mixing an iron-based powder with a composite oxide powder, the method comprising the steps of:
   heating a composite oxide containing, by mass:
      from 15% to 30% Si,
      from 9% to 18% Al,
      from 3% to 6% B,
      from 0.5% to 3% Mg,
      from 2% to 6% Ca,
      from 0.01% to 1% Sr, and
      from 45% to 55% O to a melting point of the composite oxide or higher and then performing cooling or rapid cooling to prepare a composite oxide frit;
   coarsely pulverizing the composite oxide frit to an average particle diameter of 20 or less to prepare a coarse powder;
   finely pulverizing the coarse powder to a predetermined particle diameter with an airflow pulverizer, which uses no grinding media, to prepare a fine powder; and
   mixing the fine powder with the iron-based powder by using a shear force mixer capable of breaking up aggregates of the fine powder.

13. The method for producing an iron-based powder for powder metallurgy according to claim 12, wherein the airflow pulverizer is a jet mill.

14. The method for producing an iron-based powder for powder metallurgy according to claim 12, wherein the mixer is a double cone mixer, a stirring mixer, or an eccentric mixer.

* * * * *